United States Patent [19]

Chibana

[11] 4,262,573

[45] Apr. 21, 1981

[54] DIGITAL ELECTRONIC MUSICAL INSTRUMENTS

[75] Inventor: Masanobu Chibana, Hamamatsu, Japan

[73] Assignee: Nippon Gakki Seizo Kabushiki Kaisha, Hamamatsu, Japan

[21] Appl. No.: 10,738

[22] Filed: Feb. 9, 1979

[30] Foreign Application Priority Data

Feb. 17, 1978 [JP] Japan ................................ 53-16615

[51] Int. Cl.[3] ........................... G10H 1/00; G06F 1/02

[52] U.S. Cl. ...................................... 84/1.01; 84/1.19; 364/719

[58] Field of Search ...................... 84/1.01, 1.03, 1.19; 364/718, 719; 328/14

[56] References Cited

U.S. PATENT DOCUMENTS

| | | | |
|---|---|---|---|
| 3,821,524 | 6/1974 | Wahl | 364/719 |
| 3,821,714 | 6/1974 | Tomisawa et al. | 84/1.01 X |
| 3,882,751 | 5/1975 | Tomisawa et al. | 84/1.01 |
| 4,119,005 | 10/1978 | Kondo et al. | 84/1.19 |
| 4,131,049 | 12/1978 | Okumura et al. | 84/1.01 |

FOREIGN PATENT DOCUMENTS

| | | | |
|---|---|---|---|
| 2738352 | 3/1979 | Fed. Rep. of Germany | 364/719 |

*Primary Examiner*—J. V. Truhe
*Assistant Examiner*—Forester W. Isen
*Attorney, Agent, or Firm*—Charles E. Pfund

[57] ABSTRACT

There are provided means for generating a digital information which varies periodically and repeatedly at a rate corresponding to the pitch of a tone to be produced, a plurality of function generators respectively supplied with the digital information for producing different linear functions, means for selecting the outputs of the function generators at a timing related to the period of the digital information and means responsive to the selected output of a function generator for generating a musical tone.

7 Claims, 12 Drawing Figures

FIG.2

(A)

| Sign | MSB | | | LSB | |
|---|---|---|---|---|---|
| + | 0 | 0 | 0 | 0 | ZERO |
| + | 0 | 0 | 0 | 1 | +1 |
| + | 0 | 0 | 1 | 0 | +2 |
| + | 0 | 0 | 1 | 1 | +3 |
| + | 0 | 1 | 0 | 0 | +4 |
| + | 0 | 1 | 0 | 1 | +5 |
| + | 0 | 1 | 1 | 0 | +6 |
| + | 0 | 1 | 1 | 1 | +7 |
| − | 1 | 0 | 0 | 0 | −8 |
| − | 1 | 0 | 0 | 1 | −7 |
| − | 1 | 0 | 1 | 0 | −6 |
| − | 1 | 0 | 1 | 1 | −5 |
| − | 1 | 1 | 0 | 0 | −4 |
| − | 1 | 1 | 0 | 1 | −3 |
| − | 1 | 1 | 1 | 0 | −2 |
| − | 1 | 1 | 1 | 1 | −1 |

(B) RADIX POINT ▼ (between the 4th and 5th bits)

| Sign | | | | | | |
|---|---|---|---|---|---|---|
| + | 0 | 0 | 0 | 0 | 1 | +0.5 |
| + | 0 | 0 | 0 | 1 | 1 | +1.5 |
| + | 0 | 0 | 1 | 0 | 1 | |
| + | 0 | 0 | 1 | 1 | 1 | |
| + | 0 | 1 | 0 | 0 | 1 | |
| + | 0 | 1 | 0 | 1 | 1 | |
| + | 0 | 1 | 1 | 0 | 1 | |
| + | 0 | 1 | 1 | 1 | 1 | +7.5(+π) |
| − | 1 | 0 | 0 | 0 | 1 | −7.5(−π) |
| − | 1 | 0 | 0 | 1 | 1 | |
| − | 1 | 0 | 1 | 0 | 1 | |
| − | 1 | 0 | 1 | 1 | 1 | |
| − | 1 | 1 | 0 | 0 | 1 | |
| − | 1 | 1 | 0 | 1 | 1 | |
| − | 1 | 1 | 1 | 0 | 1 | |
| − | 1 | 1 | 1 | 0 | 1 | −0.5 |

(C)

| | | | | | |
|---|---|---|---|---|---|
| | | | | | |
| | | | | | |
| | | | | | |
| | | | | | |
| | | | | | |
| | | | | | |
| | | | | | |
| | | | | | |
| 0 | 1 | 1 | 1 | 1 | +7.5(+π) |
| 0 | 1 | 1 | 0 | 1 | |
| 0 | 1 | 0 | 1 | 1 | |
| 0 | 1 | 0 | 0 | 1 | |
| 0 | 0 | 1 | 1 | 1 | |
| 0 | 0 | 1 | 0 | 1 | |
| 0 | 0 | 0 | 1 | 1 | |
| 0 | 0 | 0 | 0 | 1 | +0.5 |

(D) |x| ▼

| | | | | | |
|---|---|---|---|---|---|
| 0 | 0 | 0 | 0 | 1 | 0.5 |
| 0 | 0 | 0 | 1 | 1 | |
| 0 | 0 | 1 | 0 | 1 | |
| 0 | 0 | 1 | 1 | 1 | |
| 0 | 1 | 0 | 0 | 1 | |
| 0 | 1 | 0 | 1 | 1 | |
| 0 | 1 | 1 | 0 | 1 | |
| 0 | 1 | 1 | 1 | 1 | +7.5(+π) |
| 0 | 1 | 1 | 1 | 1 | +7.5(+π) |
| 0 | 1 | 1 | 0 | 1 | |
| 0 | 1 | 0 | 1 | 1 | |
| 0 | 1 | 0 | 0 | 1 | |
| 0 | 0 | 1 | 1 | 1 | |
| 0 | 0 | 1 | 0 | 1 | |
| 0 | 0 | 0 | 1 | 1 | |
| 0 | 0 | 0 | 0 | 1 | 0.5 |

DIGITAL ELECTRONIC MUSICAL INSTRUMENTS

BACKGROUND OF THE INVENTION

This invention relates to digital electronic musical instruments.

For use in prior art electronic musical instruments various means have been proposed to obtain desired musical tone waveforms. One such proposal is disclosed in U.S. Pat. No. 3,882,751 to Norio Tomisawa dated May 13, 1975. According to the waveform memory read-out system disclosed in this patent, there is provided a frequency information memory device adapted to store frequency information data F corresponding to or proportional to the tone pitches of respective keys of a keyboard of the musical instrument and the frequency information memory device is addressed by a key information representing a depressed key. The read out frequency information F is repeatedly accumulated at a definite speed to form an accumulated valve qF (where q=1, 2, 3, . . . ) which is utilized in a waveform memory device which stores amplitude values at successive sampling points of one period of a desired musical tone waveform to successively read out the amplitude values at successive sampling points thereby forming a desired musical tone waveform.

Another proposal is disclosed in U.S. Pat. No. 3,821,714 to Norio Tomisawa dated June 28, 1974. In this patent, a harmonic synthesizing system is disclosed wherein a fundamental wave (fundamental tone) corresponding to the tone pitch of a depressed key and harmonic components thereof (harmonics) are generated. After multiplying these fundamental wave and harmonic components by corresponding amplitude coefficients, their products are synthesized to obtain a musical tone.

In order to produce musical tones rich in naturality, however, such prior art systems have the following problems. More particularly, in the former electronic musical instrument of the waveform memory device read out type, when the waveform stored in the waveform memory device is once set, it is impossible to change the waveform that is the tone color because the shape of the read out musical tone waveform is always the same. To solve this problem, it has been proposed to provide a plurality of waveform memory devices which store musical tone waveforms having different shapes so as to selectively access these plurality of waveform memory devices thereby changing the shape of the waveform of the generated musical tone. However, an electronic musical instrument having such construction is complicated because it requires a number of waveform memory devices.

Where it is desired to vary with time the tone color as the time elapses after depression of a key just like a natural musical instrument, there is a difficult problem that it is not simple to vary with time the waveform read out of the waveform memory device.

Furthermore in the latter electronic musical instrument of the harmonic synthesizing type, in order to vary the shape of the synthesized musical tone waveform, it is necessary to prepare a large number of amplitude coefficients multiplied with the fundamental wave and the harmonic components thereof. As a consequence, it is necessary to increase the number of the memory devices for storing a large number of the amplitude coefficients.

SUMMARY OF THE INVENTION

Accordingly, it is the principal object of this invention to provide a digital electronic musical instrument capable of readily producing musical tones, rich in naturality, even when they have complicated waveforms.

Another object of this invention is to provide a digital electronic musical instrument having a simple construction which can produce musical tones having complicated waveforms.

According to this invention there is provided an electronic musical instrument comprising means for generating a digital information which varies periodically and repeatedly corresponding to a tone pitch of a depressed key of a keyboard of the musical instrument, a plurality of function generators respectively supplied with the digital information to generate different linear functions, means for selecting the outputs of the plurality of function generators with a timing related to the period of said digital information, and means for generating a musical tone based on the output of a function generator selected by the selecting means.

DESCRIPTION OF THE PREFERRED EMBODIMENTS

General Construction

The electronic musical instrument of this invention comprises means for generating digital information which periodically and repeatedly varies corresponding to the tone pitch of a depressed key, a plurality of function generators respectively supplied with the digital information for producing different linear functions, means for selecting the outputs of the plurality of function generators in accordance with the variation in the digital information X and musical tones corresponding to the selected output of the function generator. In the same manner as the electronic musical instrument of the waveform memory device read out type, a frequency information memory device storing frequency information data F corresponding to the tone pitches of respective keys is addressed to read out corresponding frequency information data F, and this read out frequency information data are repeatedly accumulated at a definite speed to obtain an accumulated value qF (q=1, 2, 3, . . . ). This accumulated value is used as the digital information X, and expressed as a value $(-\pi\sim+\pi)$ corresponding to one period $(-\pi\sim+\pi)$ of the musical tone waveform to be formed. The plurality of function generators adapted to generate different primary functions generate primary functions, for example $[f(x)=-x]$ or $[f(x)=\pi-x]$ based on the digital information x whose value varies periodically. Accordingly, it is possible to produce a musical tone waveform corresponding to the tone pitch of a depressed key by selecting the outputs of these function generators in accordance with the variation in the digital information x and then converting the selected output into a musical tone waveform. By constructing the means for selecting the outputs of the plurality of function generators in accordance with the variation in the digital information x such that it comprises a comparator for sequentially comparing the digital information x with any reference value, for example $\theta$ (where $-\pi<\theta<\pi$) to select the pluarality of function generators, it is easy to vary, in a complicated manner, the waveform by varying the reference value $\theta$. Where the reference value $\theta$ takes the form of a reference value function $\theta(t)$ which varies with time the selection of the outputs of the function generators will vary with time. For this reason, it is possible to vary, in a complicated manner, the shape of the musical tone waveform, that is the color of the generated musical tone.

Preferred Embodiments

Some typical preferred embodiments of the electronic musical instrument of this invention will now be described in detail with reference to the accompanying drawings.

Figure 1:
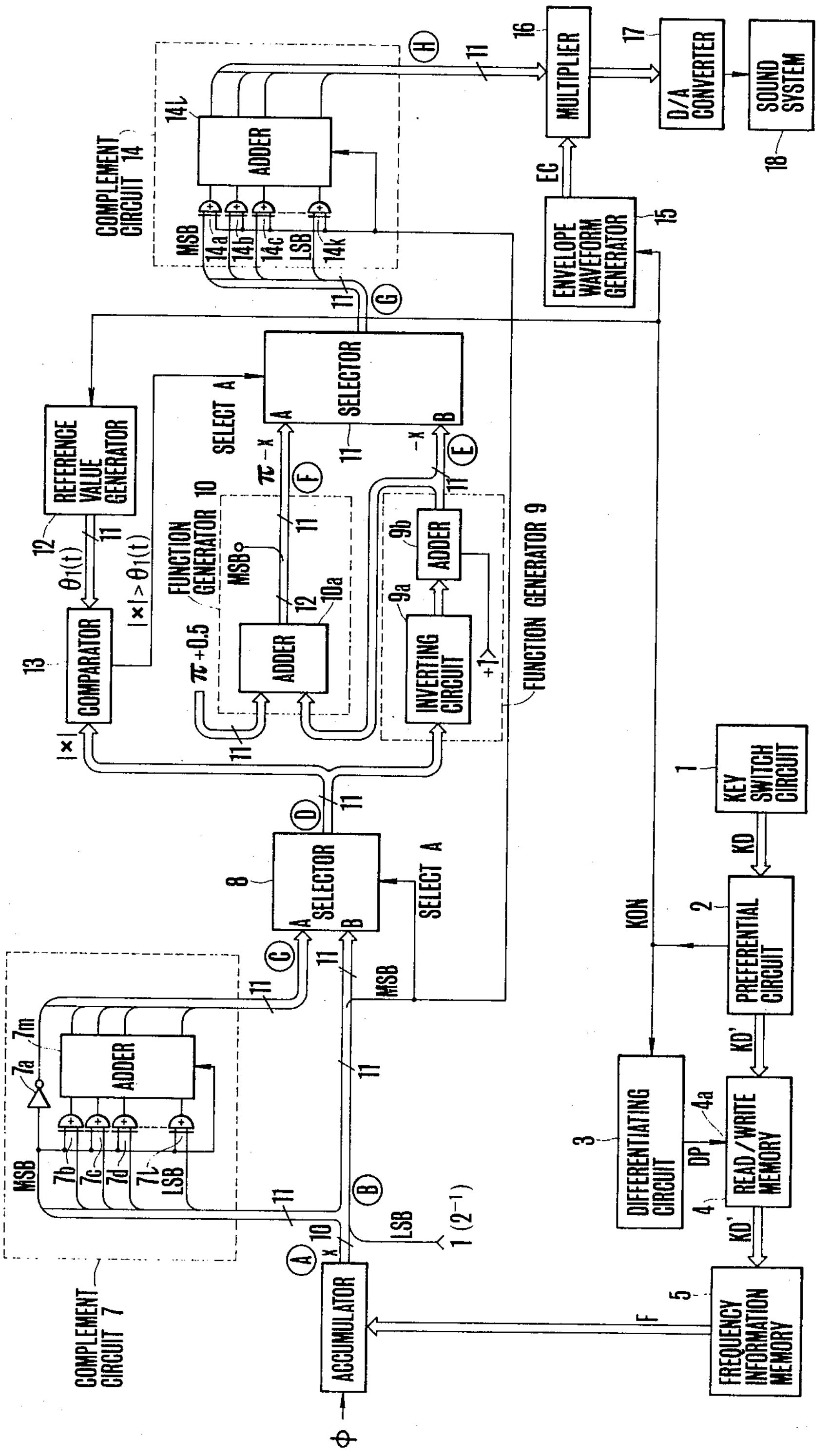
FIG. 1 is a block diagram showing one embodiment of a digital electronic musical instrument according to this invention.

One embodiment shown in FIG. 1 comprises a key switch circuit 1 including a plurality of key switches (not shown) provided for respective keys (for example 61 keys) of a keyboard (not shown) to produce key data KD. These key data are applied to a preferential circuit 2 which is constructed to produce only one key data KD' (key switch output) in accordance with a predetermined order of preference (for example lower tone preference) when a plurality of keys are depressed simultaneously and to produce a key-on signal KON that represents that any one of the keys has been depressed. The leading edge of the key-on signal KON produced by the preferential circuit 2 is differentiated by differentiating circuit 3 to produce a differential pulse DP which is applied to the read/write control terminal 4*a* of a read/write memory device 4 to write therein the key data KD' produced by the preferential circuit 2. In the absence of the differential pulse DP, the key data KD' written in the read/write memory device 4 are read out continuously. A frequency information memory device 5 is provided to store frequency information data F as shown in the following Table 1. The frequency information memory device 5 is addressed by the key data KD' produced by the read/write memory device 4 to read out corresponding frequency information data.

The data stored in the frequency information memory device 5 comprise 15 bits as shown in Table 1, of which one bit represents as integer section and the other 14 bits a fractional section. The values F shown in Table 1 are decimal data converted from binary data.

TABLE 1

| | integer section | fractional section | | | | | | | | | | | | | | F value in decimal |
|---|---|---|---|---|---|---|---|---|---|---|---|---|---|---|---|---|
| | 15 | 14 | 13 | 12 | 11 | 10 | 9 | 8 | 7 | 6 | 5 | 4 | 3 | 2 | 1 | |
| $C_2$ | 0 | 0 | 0 | 0 | 0 | 1 | 1 | 0 | 1 | 0 | 1 | 1 | 0 | 0 | 1 | 0.052325 |
| $C_3$ | 0 | 0 | 0 | 0 | 1 | 1 | 0 | 1 | 0 | 1 | 1 | 0 | 0 | 1 | 0 | 0.104650 |
| $C_4$ | 0 | 0 | 0 | 1 | 1 | 0 | 1 | 0 | 1 | 1 | 0 | 0 | 1 | 0 | 1 | 0.209300 |
| $C_5$ | 0 | 0 | 1 | 1 | 0 | 1 | 0 | 1 | 1 | 0 | 0 | 1 | 0 | 1 | 0 | 0.418600 |
| $C_6$ | 0 | 1 | 1 | 0 | 1 | 0 | 1 | 1 | 0 | 0 | 1 | 0 | 1 | 0 | 0 | 0.837200 |
| $D^{\#}_6$ | 0 | 1 | 1 | 1 | 1 | 1 | 1 | 1 | 0 | 1 | 1 | 1 | 0 | 0 | 0 | 0.995600 |
| $E_6$ | 1 | 0 | 0 | 0 | 0 | 1 | 1 | 1 | 0 | 0 | 0 | 0 | 0 | 0 | 1 | 1.054808 |
| $C_7$ | 1 | 1 | 0 | 1 | 0 | 1 | 1 | 0 | 0 | 1 | 0 | 1 | 0 | 0 | 1 | 1.674400 |

The frequency information data F produced by the frequency information memory device 5 is applied to an accumulator 6 which sequentially accumulates the data F in accordance with a clock pulse $\phi$ to produce an accumulated value qF(q=1, 2, 3, . . . ) as digital information x which is constituted by, for example, 10 bits. This 10 bit digital information x (accumulated value qF) exhibits values between 0 and $+\pi$ and between $-\pi$ and 0 to be used for the phases of one period $[-\pi\sim+\pi]$ of the waveform of a musical tone to be generated. For the purpose of obtaining symmetry of the positive side ($+\pi$ side) and the negative side ($-\pi$ side) of this digital information x, a further bit line $[2^{-1}(=0.5)]$ is added to the lower side of the least significant bit $[2^0(=1)]$ of the 10 bit digital information x to form a 11 bit digital information, in which case the radix point is positioned between the 10th and 11th bits.

A complement circuit 7 is provided which functions to convert into a positive value the 11 bit digital information x when it is negative. The complement circuit 7 is constituted by an inverter $7_a$, exclusive OR gate circuits $7_b$–$7_l$ and an adder $7_m$. A selector 8 is provided which operates to select an A side input (the digital information x converted into a positive value by the complement circuit 7) when the digital information x is negative ($-\pi$ side), that is when the most significant bit (MSB) of the information x is "1", whereas to select a B side input where the most significant bit of the digital information x is "0" for producing the absolute value $|x|$ of the digital information x. A function generator 9 comprising an inverting circuit $9_a$ and an adder $9_b$ is provided to form a linear function $[f_1(x)=-x]$ from the digital information $|x|$. Furthermore, a second function generator 10 is provided including an adder $10_a$ which adds $(\pi+0.5)$ to the primary function $[f_1(x)=-x]$ produced by the first function generator 9. The output of the adder $\mathbf{10}_a$ has 12 bits but the most significant bit MSB is ignored. A selector 11 is provided to select between the outputs of the first and second function generators 9 and 10. There is also provided a reference value generator 12 which is started by a key-on signal KON produced by the preferential circuit 2 when a key is depressed to read out data stored in a memory device contained in the reference value generator 2 in accordance with its own clock pulse thus producing a reference value $\theta_1(t)$. A comparator 13 compares the reference value $\theta_1(t)$ with the digital information $|x|$ from the selector 8 for supplying to selector 11 a select A signal when $|x|>\theta_1(t)$ thereby causing the selector 11 to select the output of the second function generator 10. A complement circuit 14 is provided to reverse the sign (positive or negative) of the linear function $[f_1(x)=-x]$ or $[f_2(x)=\pi-x]$ produced by the selector 11 when the digital information x produced by the accumulator 6 is negative (a case wherein MSB is "1"). This complement circuit 14 comprises exclusive OR gate circuits $\mathbf{14}_a$ through $\mathbf{14}_k$ and an adder $\mathbf{14}_l$, and produces an output which forms an amplitude value of each sampling point of one period of the musical tone waveform. Consequently, the waveform of the musical tone ultimately produced by the complement circuit 14 is expressed by the following equations.

When $x \geqq 0$ $$f_1(x)=-x[0\leqq x\leqq\theta_1(t)]$$

$$f_2(x)=\pi-x[\theta_1(t)<x\leqq\pi(t)]$$

when $x\leqq 0$ $$f_1(x)=-f_1(-x)=+x[-\theta_1(t)<x\leqq 0]$$

$$f_2(x)=-f_2(-x)=-(\pi+x)[-\pi\leqq x\leqq-\theta_1(t)]$$

Furthermore, there are provided an envelope waveform generator 15 which is started by a key-on signal KO to generate an envelope waveform signal EC adapted to control such envelopes as attack, sustain and decay of the waveform of the musical tone, a multiplier 16 which multiplies the musical tone waveform produced by the complement circuit 14 with the envelope waveform signal EC to apply a volume envelope to the musical tone waveform, a digital-to-analogue converter 17 which converts digital musical tone signal produced by the multiplier 16 into an analogue musical tone signal, and a sound system 18 which converts the musical tone signal produced by the digital analogue converter 17 into a musical sound.

The electronic musical instrument shown in FIG. 1 operates as follows.

When a key of the keyboard is depressed, a key switch corresponding to this key operates to supply a signal "1" to the preferential circuit 2 as a key data KD through an output line of the key switch circuit 1 corresponding to the operated key switch. The preferential circuit 2 selects a key data corresponding to a key switch having the highest order of preference (first priority) among the key data KD supplied thereto so as to produce the selected key data as a key data KD'. At the same time, the preferential circuit 2 produces a key-on signal KON representing that at least one of the keys has been depressed. The differentiating circuit 3 differentiates the leading edge of the key-on signal KON to supply to the read/write control terminal $\mathbf{4}_a$ of the read/write memory device 4 a narrow width differential pulse DP synchronous with the leading edge of the key-on signal KON. While the differential pulse DP is supplied from the differentiating circuit 3, the read/write memory device 4 changes its content to the key data KD' supplied from the preferential circuit D to store the key data KD'. Consequently, the read/write memory circuit 4 continues to produce the same key data KD' until a next new key is depressed to produce a new key-on signal KON. The frequency memory device 5 is addressed by the key data KD' generated by the read/write memory device 4 whereby a frequency information data F corresponding to the tone pitch of the depressed key is read out from the frequency information memory device 5.

This frequency information data F read out from the frequency information memory device 5 and corresponding to the tone pitch of the depressed key is repeatedly accumulated by accumulator 6 with the period of the clock pulse $\phi$ and the accumulated value qF( q=1, 2, 3, . . . ) is produced as a digital information x whose content periodically and repeatedly varies corresponding to the tone pitch of the depressed key. This digital information has 10 bits, for example, which repeatedly vary from all "0" to all "1" and exhibits values between $-\pi$ and $+\pi$ to be used for phases of one period $(-\pi\sim+\pi)$ of the musical tone waveform.

For the purpose of simplifying the description, let us assume that the digital information x is constituted by 4 bits. In this case, the digital information x can be shown by a data table (A) shown in FIG. 2. In this case, the most significant bit MSB of the digital information x indicates the sign positive or negative of the value wherein "1" means negative. Numerals (0, +1, +2, . . . −1) in the righthand column of this data table are decimal representations of the information x. The operation up to the production of the ultimate musical tone waveform will be described hereunder with reference to a case wherein a digital information x shown by the data table (A) is delivered from the accumulator 6. It is to be understood that the data tables (A) through (H) shown in FIG. 2 corresponds to points (A) - (H) respectively shown in FIG. 1.

Figure 2:
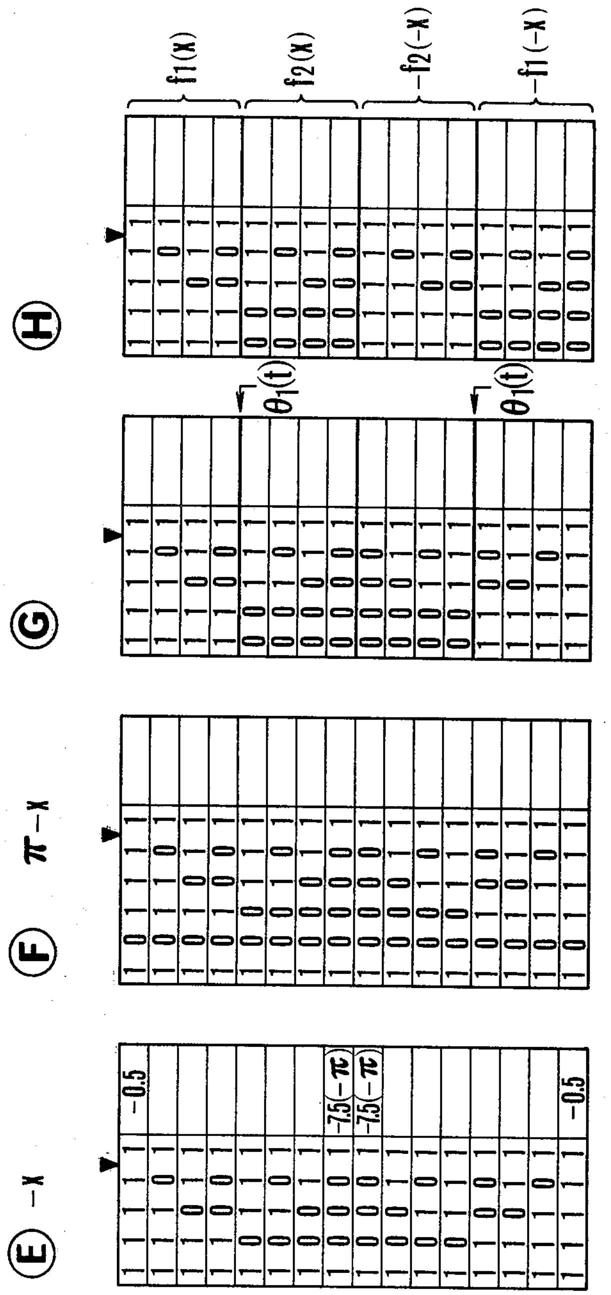
FIG. 2 shows data tables of the digital informations at points A through H in FIG. 1.
Figure 3:
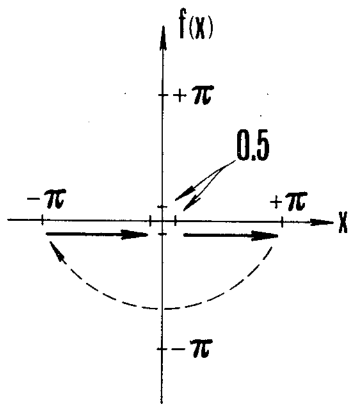
FIG. 3 is a graph showing the manner of varying the data of a digital information applied to a function generator shown in FIG. 1 during one period.

The value range of this four bit digital information x is asymmetric about zero, the maximum positive deviation being +7 and the maximum negative deviation being −8. In order to make the positive and negative range symmetrical, one-bit lower side of a bit line of $[2^{-1}=(0.5)]$ is added to one-bit lower side of the least significant bit of the 4 bit digital information and value "1" is always applied to such added bit line. More particularly $[2^{-1}(=0.5)]$ is normally added to the digital information produced by the accumulator 6. The data table B shown in FIG. 2 shows the digital information x added with this adjustment value $[2^{-1}(=0.5)]$. In this case, the maximum deviation value of the digital information in the positive region is 7.5 as expressed in decimal which is the sum of a value 7 as represented by a binary signal "0111" and a value $0.5(=2^{-1})$, whereas the maximum deviation value in the negative region is −7.5 as expressed in decimal which is the sum of a value −8 as represented by a binary signal "1000" and a value $0.5(=2^{-1})$. As a consequence, the digital information x applied to the plurality of function generators varies periodically within the symmetrical range between +7.5 and −7.5 to be used as the phase angle range between $+\pi$ and $-\pi$. The variation is [0.5]→[$+\pi$] and then [$-\pi$]→[0.5] as shown by a transition diagram of [x] shown in FIG. 3. The period in which the value of information x varies from [0.5] to [−0.5], that is the repetition period of the digital information x differs depending upon the frequency information data F corresponding to the tone pitch of a depressed key. In other words, since the frequency information data F corresponding to the tone pitch of the depressed key is set to a higher value as the tone pitch of the depressed key increases, when the frequency information data is sequentially accumulated by the accumulator 6 in accordance with the clock pulse $\phi$ the repetition period of the output (digital information x) of the accumulator 6 becomes shorter as the tone pitch of the depressed key increases.

Where the most significant bit MSB is "1" and has a negative value, the digital information x is converted into a positive value by the complement circuit 7 and then supplied to the A side input of the selector 8 (data table C shown in FIG. 2). Since the most significant bit MSB of the digital information x is applied to the selected A control input, the selector 8 selects the output of the complement circuit 7 applied to its A side input, where the digital information x has a negative value (MSB="1"). On the other hand, when the digital information x has a positive value, the selector 8 selects the B side input. Therefore, the absolute value $|x|$ of the digital information x as shown in the data table Ⓓ shown in FIG. 2 would appear at the output (point Ⓓ shown in FIG. 1). This absolute value $|x|$ of the digital information x is applied to the function generator 9 which generates the linear function [$f_1(x)=-x$] so that the output (point Ⓔ shown in FIG. 1) of the function generator 9 comprises a linear function [$f_1(x)=-x$] whose value varies in proportion to the variation of the absolute value $|x|$ as shown in the data table E shown in FIG. 2. The linear function [$f_1(x)=-x$] produced by the function generator 9 is applied to the input of the other function generator 10 where it is added to a constant [$\pi+0.5$] by the adder 10$_a$. Consequently, the function generator 10 produces a linear function [$f_2(x)=\pi-x$] (see FIG. 2 Ⓕ ). At this time, the sum of the constant [$\pi+0.5$] and the linear function [$f_1(x)=-x$] overflows to increase the number of bits by one, but this overflow, this is the bit line of the most significant bit MSB of the output of the adder 10$_a$ is interrupted at an intermediate point.

As above described the function generators 9 and 10 generate the linear functions [$f_1(x)=-x$] and [$f_2(x)=\pi-x$] respectively based upon the absolute value $|x|$ of the digital information x and these functions are applied to the selector 11 which selects either one of them. On the other hand, the absolute value $|x|$ is sequentially compared with the reference value $\theta_1(t)$ by the comparator 13. When $|x|>\theta_1(t)$, due to the variation in the absolute value $|x|$ of the digital information, the comparator 13 will supply a select A signal to the selector 11 to select and produce the A side input or the linear function [$f_2(x)=\pi-x$]. When the absolute value $|x|$ of the digital information x is $|x|\leqq\theta_1(t)$, the selector 11 selects and produces the B side input that is the linear function [$f_1(x)=-x$]. Consequently, the selector 11 produces functions which differ as the absolute value $|x|$ of the digital information varies. (FIG. 2 Ⓖ ).

In this manner, a function $f_1(x)$ or $f_2(x)$ selected and produced by the selector 11 is converted from positive to negative by the complement circuit 14 and negative to positive when the digital information x is negative which is used as a base to obtain the function outputs. In the data tables Ⓖ and Ⓗ shown in FIG. 2, the reference value $\theta(t)$ is set to 3.5. Consequently, the function produced by the complement circuit 14 is represented by $f_1(x)$ where the digital information x is in a rage of [$+0.5\sim+3.5$], by $f_2(x)$ in a range of [$+4.5\sim+7.5$], by $-f_2(x)$ in a range of [$-7.5\sim-4.5$] and by $-f_1(-x)$ in a range of [$-3.5\sim-0.5$].

Figure 4:
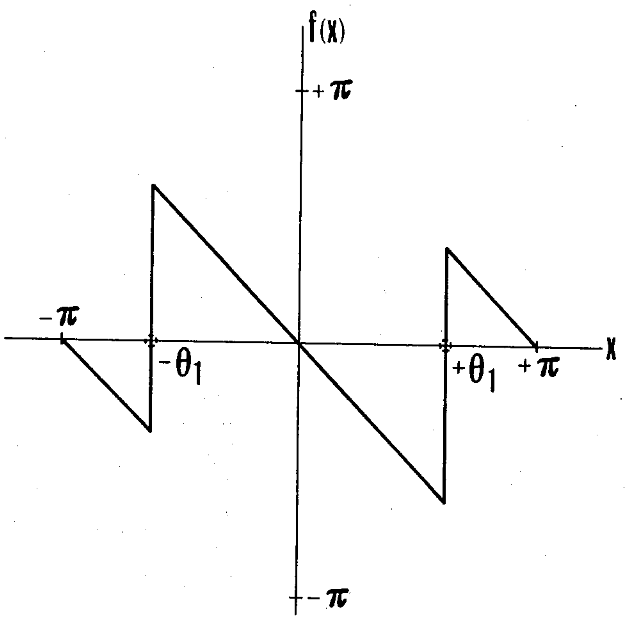
FIG. 4 is a diagram showing the envelope of a function output as the digital information shown in FIG. 1 varies.
Figure 5:
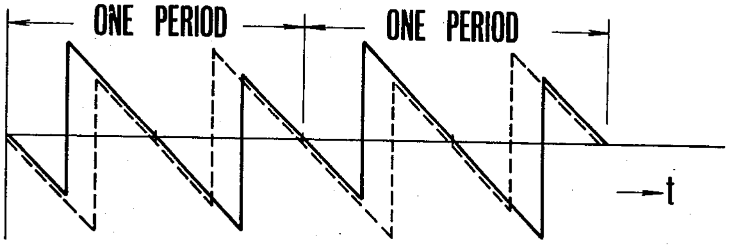
FIG. 5 shows the waveform of a musical tone produced by the electronic musical instrument shown in FIG. 1.
Figure 6:
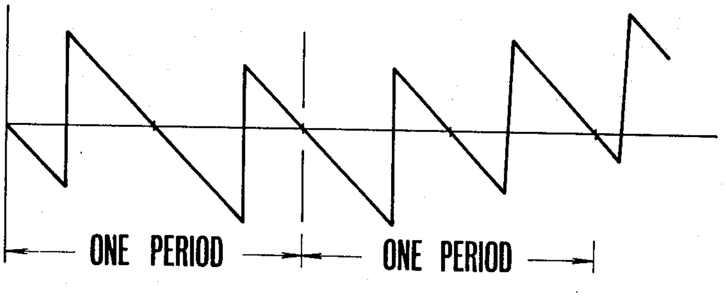
FIG. 6 shows the waveform of a musical tone which is produced by the electronic musical instrument shown in FIG. 1 when the reference value is varied with time.

FIG. 4 shows a function output at point H shown in FIG. 1 when the digital information x varies. The function output shown in FIG. 4 is used to form the waveform of the musical tone to be produced, and supplied to the multiplier 16. Since the digital information x varies in a manner [+0.5]→[$+\pi$]→[$-\pi$]→[−0.5]→[+0.5] the waveform of the musical tone takes the shape as shown by the solid line shown in FIG. 5. In this case, when the reference value $\theta_1(t)$ is varied the waveform of the musical tone will take a shape as shown by the dotted lines in FIG. 5, whereas when the reference value $\theta_1(t)$ is varied with time after the depression of the key, a waveform of the musical tone whose shape varies with time in a complicated manner as shown in FIG. 6 can be obtained. Of course, the repetition period of the musical tone waveform thus obtained corresponds to the tone pitch of the depressed key.

The musical tone signal produced in this manner is multiplied with the envelope waveform signal EC produced by the envelope waveform generator 15 by the multiplier 16 to be imparted with such volume envelope as an attack, a sustain or a decay. The musical tone signal imparted with the volume envelope is converted into an analogue musical tone signal by the digital analogue converter 17 and then produced as a musical sound by the sound system 18.

As above described, with the electronic musical instrument constructed as above described it is easy to vary the shape of the musical tone waveform by varying the reference value utilized to select one of a plurality of the function generators as the digital information x varies. Furthermore, since a pluarlity of function generators which produce different functions are provided it is possible to readily produce a musical tone waveform having complicated shape.

Figure 7:
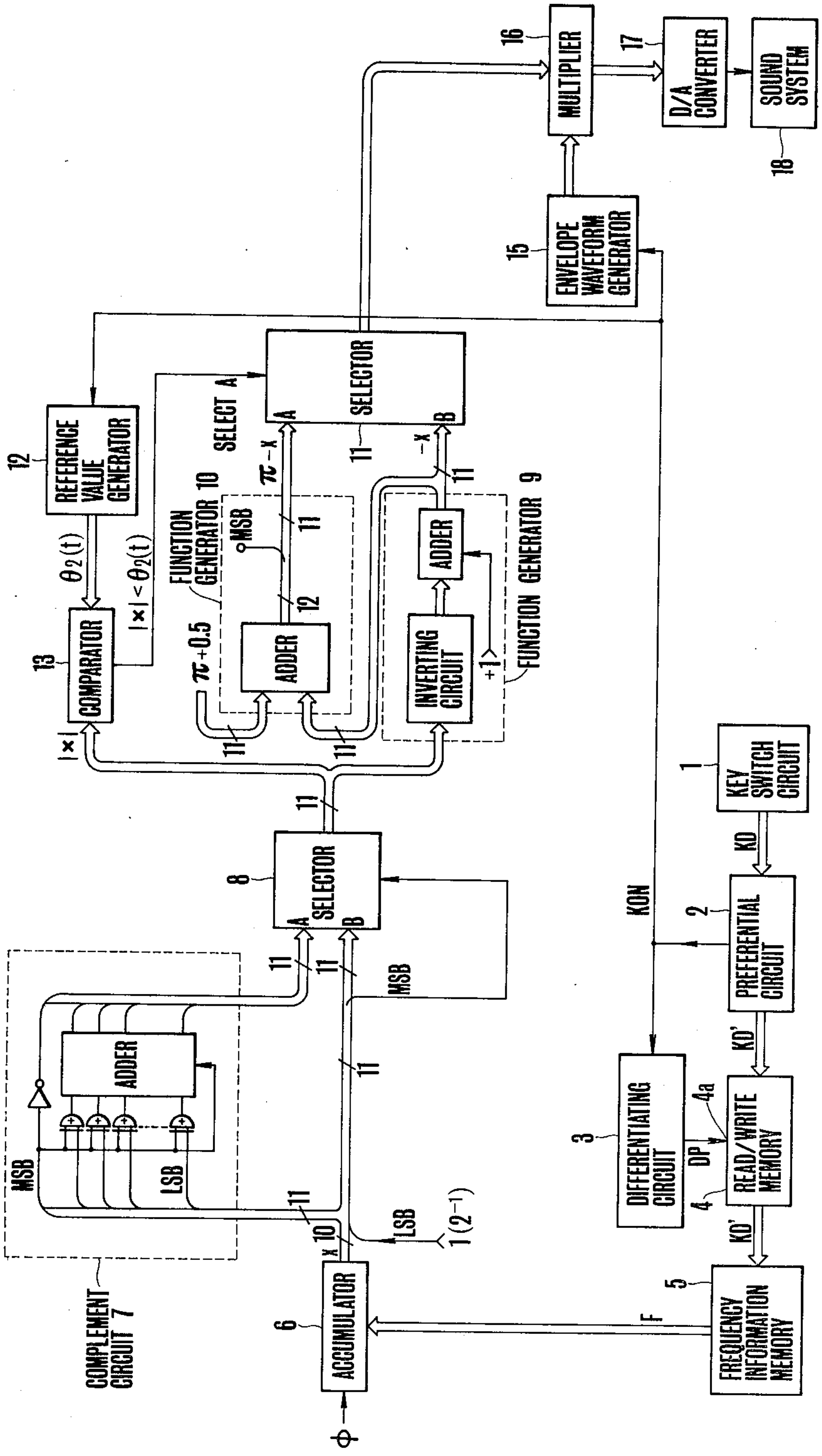
FIG. 7 is a block diagram showing another embodiment of this invention.

FIG. 7 is a block diagram showing another embodiment of the electronic musical instrument according to this invention, in which elements corresponding to those shown in FIG. 1 are designated by the same reference numerals. This modification is different from the embodiment shown in FIG. 1 in the following respects. Although the reference generator 12 is the same as that shown in FIG. 1, for the sake of explanation, the reference value produced thereby is denoted as $\theta_2(t)$. Comparator 13, which sequentially compares the absolute value $|x|$ of the digital information x with a reference value $\theta_2$, applies its output to the selector 11 as the select A signal and produces an output when $|x|<\theta_2(t)$. Also, the complement circuit connected to the output of the selector 11 in the embodiment shown in FIG. 1 is eliminated and the output of the selector 11 is applied directly to the multiplier 16. Consequently, the function output produced by the selector 11, that is the musical tone waveform, is shown by the following equation when the function produced by the function generator 9 is expressed by [$f_1(x)=-x$] and when the function produced by the function generator 10 is expressed by $[f_2(x)=-x]$.

Where $$x \geqq 0$$

$$f_1(x)=\pi-x[0\leqq x<+\theta_2(t)]$$

$$f_2(x)=-x[+\theta_2(t)\leqq x\leqq+\pi]$$

where $$x \leqq 0$$

$$f_1(x)=f_1(-x)=\pi-x[-\theta_2(t)<x\leqq 0]$$

$$f_2(x)=f_2(-x)=-x[-\theta_2(t)\leqq x\leqq-\pi]$$

Figure 8:
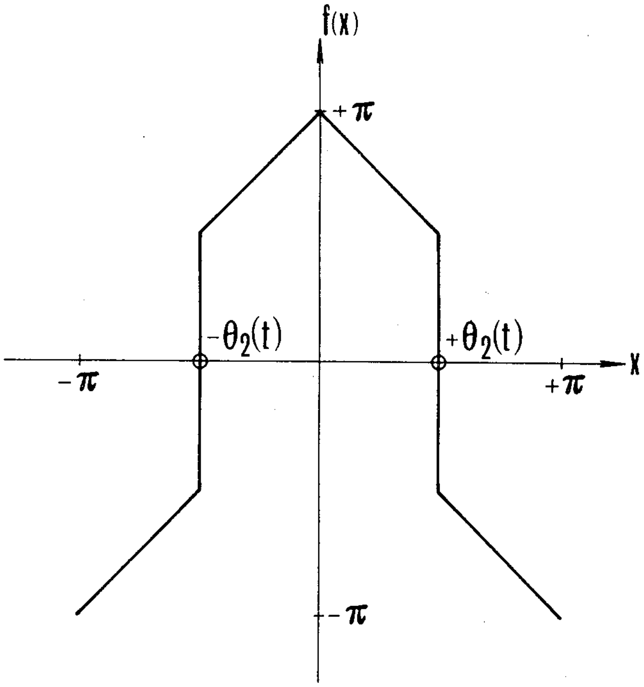
FIG. 8 shows the waveform of a musical tone produced by the musical instrument shown in FIG. 7.

Consequently, the waveform of the function output produced by the selector 11 is shown by FIG. 8 and by applying this function output to the multiplier 16, the same object as the first embodiment can be attained.

Figure 9:
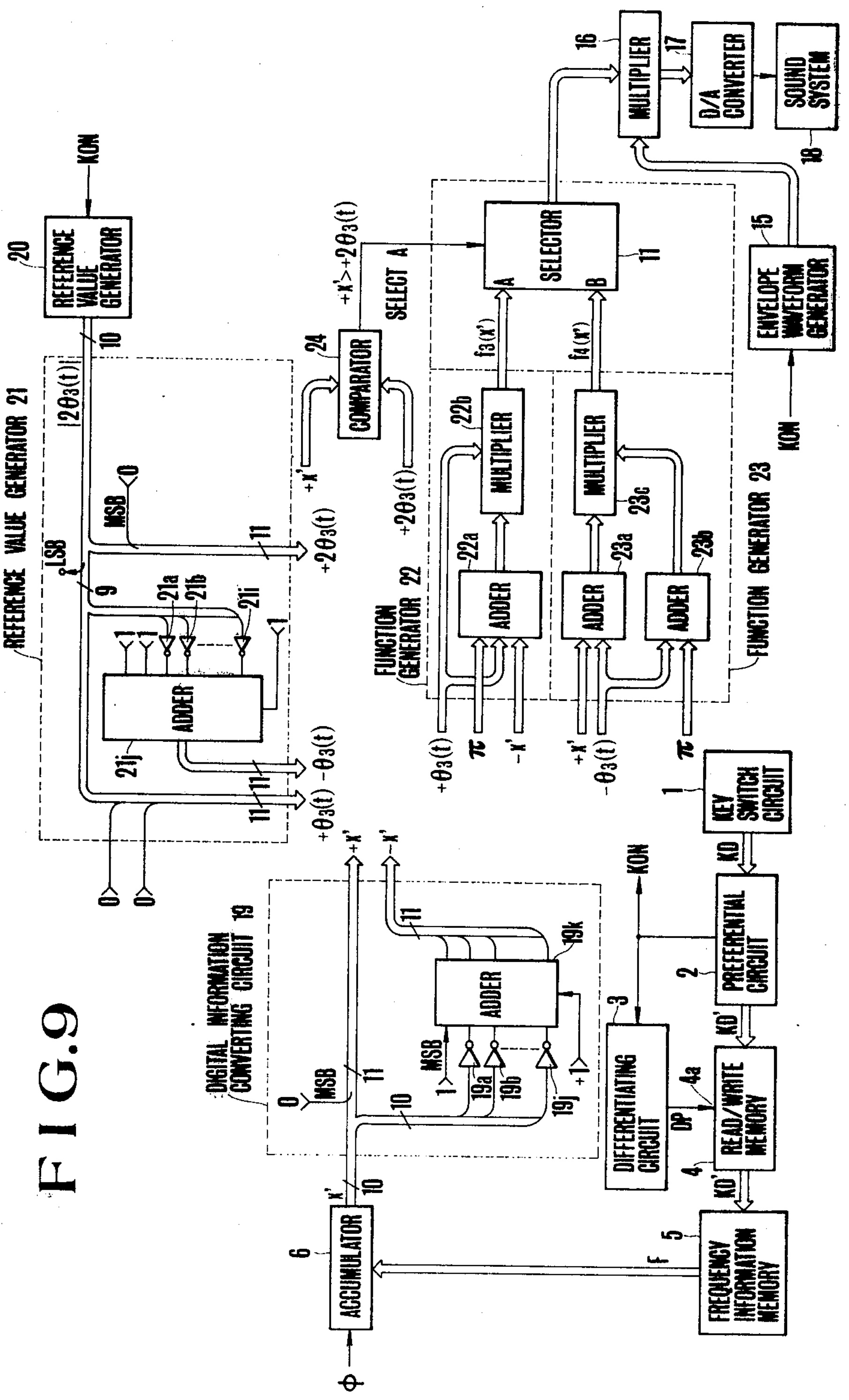
FIG. 9 is a block diagram showing still another embodiment of this invention.

FIG. 9 is a block diagram showing still another embodiment of the electronic musical instrument of this invention, in which the same elements as those shown in FIG. 1 are designated by the same reference numerals. As shown, there is provided an information converting circuit 19 which converts the digital information x which was used in a range from $-\pi$ to $+\pi$ in the foregoing embodiments into a digital information in a range of from $-2\pi$ to $+2\pi$. The information converting circuit 19 functions to add one bit to the sign bit (positive="0", negative="1") at the most significant bit of the digital information x produced by the accumulator 6, thereby obtaining a digital information [+x'] that represents a range of $0\sim 2\pi$ and a digital information [−x'] that represents a range $-2\pi\sim 0$.

More particularly, the digital information [+x'] is formed by normally applying a "0" signal that represents a positive sign to the bit line added at a position one bit above the most significant bit of the digital information x produced by the accumulator 6. On the otherhand, the digital information [−x'] is formed by converting the digital information x into a negative value by a "twos complement circuit" constituted by inverters $19_a$ through $19_j$ and an adder $19_k$, and by normally applying a signal "1" that represents a negative sign to the most significant bit input of the adder 19*k*. A reference value generator 20 starts its operation in response to a key-on signal KON generated by the preferential circuit 2 when a key is depressed to read out the data stored in an interior memory device under the control of an independent clock pulse. The read out data is used as a reference value $|2\theta_3(t)|$ for the variation in the digital information x.

A second reference value generator 21 is provided which in response to the reference value $|2\theta_3(t)|$ generated by the reference value generator 20 generates new reference values $+\theta_3(t)$, $-\theta_3(t)$ and $+2\theta_3(t)$ of which the reference value $+2\theta(t)$ is formed by adding a sign bit line at a position one bit above the most significant bit of the reference value $|2\theta_3(t)|$ produced by the reference value generator 20 and by normally applying to the added bit line a signal "0" which represents a positive. The reference value $+\theta_3(t)$ is obtained by interrupting the least significant bit line of the reference value $|2\theta_3(t)|$ at an intermediate point, shifting by one bit the remaining bit line to lower bit, adding "0" to the bit position which has been the most significant bit MSB before said shifting to obtain $|\theta_3(t)|$, adding a sign bit line to $|\theta_3(t)|$ and normally applying a signal "0" that represents a positive sign to the sign bit line. On the otherhand, the reference value $-\theta_3(t)$ is formed by interrupting the least significant bit line of the reference value $2\theta_3(t)$ at an intermediate point, shifting by one bit the remaining bit line to a lower bit, converting the shifted bit line into a negative value by the "twos complement circuit" constituted by the inverters $21_a$–$21_j$ and the adder $21_j$, normally applying a signal "1" that represents a negative sign to the most significant bit input of the adder $21_j$ and normally applying a signal "1" to a bit input next to that most significant bit input.

Furthermore, there is provided a function generator 22 constituted by an adder $22_a$ and a multiplier $22_b$ and produces a linear function $[f_3(x')=+\theta_3(t)(\pi+\theta_3(t)-x')]$ in response to the reference value $+\theta_3(t)$, a constant $\pi$ and a digital information [−x']. Another function generator 23 is provided constituted by adders $23_a$ and $23_b$ and a multiplier $23_c$ for generating a linear function $[f_4(x')]=[\pi-\theta_3(t)]\cdot[x'-\theta_3(t)]$ in response to the digital information [+x'], a reference value $-\theta_3(t)$ and the constant $\pi$.

A comparator 24 sequentially compares the digital information [+x'] with the reference value $+2\theta_3(t)$ to supply a select A signal to the selector 11 when $+x'>+2\theta_3(t)$. The selector 11 selects and produces the output of the function generator 22 when the digital information [+x'] is in a condition $+x'>+2\theta_3(t)$, whereas selects and produces the output of the function generator 23 when $+x'\leqq 2\theta_3(t)$. Consequently, the output functions produced by the selector 11 are expressed by the following equations.

Where $$+2\theta_3(t)<+x'\leqq 2$$

$$f_3(x')=+\theta_3(t)\cdot[\pi+\theta_3(t)-x']$$

Where $$0\leqq x'<+2\theta_3(t)$$

$$f_4(x')=[\pi-\theta_3(t)]\cdot[x'-\theta_3(t)]$$

This function produced by the selector 11 is applied to the multiplier 16 to form a musical tone waveform.

This embodiment operates as follows. Thus, when a key of the keyboard is depressed, a key switch corresponding to the depressed key operates to apply a signal "1" acting as a key data KD to the preferential circuit 2 through an output line corresponding to the operated key switch of the key switch circuit 1. The preferential circuit 2 selects a key data KD corresponding to a key switch having the highest order of preference among key data applied to the preferential circuit for producing the selected key data as a key data KD' and a key-on signal KON which represents a key that is now being depressed. The differentiating circuit 3 differentiates the build-up portion of the key-on signal KON to supply a narrow width differential pulse DP to the read/write terminal $4_a$ of the read/write memory device 4 in synchronism memory device 4 changes its content to the key data KD' supplied from the preferential circuit 2 while the differential pulse is being supplied to the memory device 4 from the differentiating circuit 3. The frequency information memory device 5 is addressed by the key data KD' produced by the read/write memory device 4 to produce a frequency information data F corresponding to the tone pitch of the depressed key.

The frequency information data F thus produced is repeatedly accumulated by the accumulator 6 at a period of the clock pulse $\phi$ and the accumulated value qF which varies periodically corresponding to the tone pitch of the depressed key is produced as a digital information.

For example, this digital information x is made up of 10 bits to represent a value corresponding to one period (in this embodiment $0-+2$) of the musical tone waveform in which 0 corresponds to "0000000000" whereas $2\pi$ corresponds to "1111111111". This digital information $x(0-2\pi)$ is applied to the digital information converting circuit 19 to be converted into a position digital information $+x'(0-2\pi)$ and a negative digital information $-x'(0-2\pi)$ which are supplied to function generators 22 and 23, respectively.

In response to a key-on signal KON produced by the depression of a key, the reference value generator 20 is started to generate a reference value $|2\theta_3(t)|$ which is applied to the secondary reference value generator 21 to cause it to generate reference values $+\theta_3(t)$, $-\theta_3(t)$ and $+2\theta_3(t)$ which are supplied to function generators 22 and 23. In the function generator 22, the constant $\pi$, the digital information $-x'$ and the reference value $\theta_3(t)$ are added together by the adder **22*a* to form a linear function $[\pi+\theta_3(t)-x']$ which is multiplied with the reference value $+\theta_3(t)$ by the multiplier 22*b*. As a consequence, the multiplier $22_b$ produces a linear function $[f_3(x')]=\theta_3(t)\cdot[\pi+\theta_3(t)-x']$ which is applied to the A side input of the selector 11**.

In the same manner, in the other function generator 23, the adder $23_a$ adds together the digital information $+x'$, and the reference value $-\theta_3(t)$ to form a linear function $[x'-\theta_3(t)]$, while the adder $23_b$ adds together the constant $\pi$, and the reference value $-\theta_3(t)$ to a linear function $[\pi-\theta_3(t)]$. These linear functions are multiplied with each other by the multiplier $23_c$ to form a linear function $[f_4(x')]=[x'-\theta_3(t)]\cdot[\pi-\theta_3(t)]$ which is applied to the B side input of the selector 11.

Figure 10:
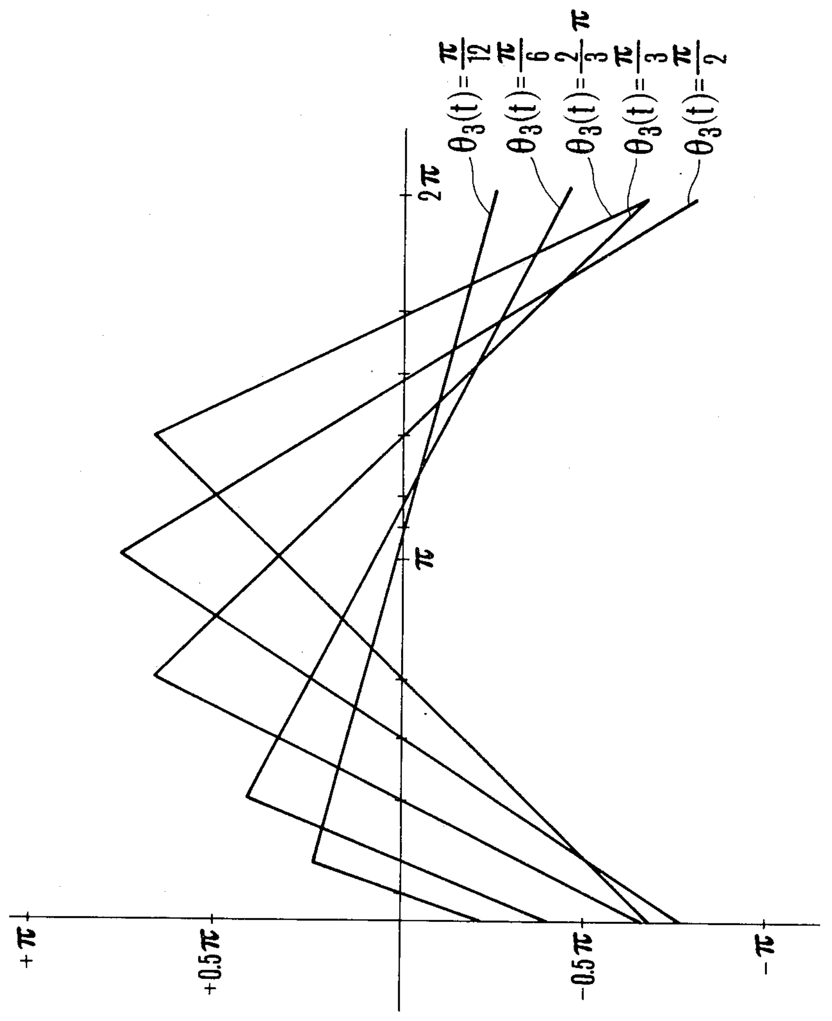
FIG. 10 shows the waveform of a musical tone produced by the musical instrument shown in FIG. 9.

The selector 11 supplied with two linear functions $f_3(x')$ and $f_4(x')$ as above described is controlled by the comparator 24 as to which one of the linear functions is to be selected and produced. More particularly, when the digital information $+x'$ is in a condition of $+x'>+2\theta_3(t)$, a select A signal is applied to the selector 11 from the comparator 24 to cause it to produce the linear function $f_3(x')$. On the otherhand, when the digital information $+x'$ is in a condition of $+x'\leqq 2\theta_3(t)$, since the comparator 24 does not produce the select A signal, the selector 11 selects and produces the B side input, that is the linear function $f_4(x')$. In this manner, the selector 11 produces different functions as the digital information $+x'$ varies, and the waveform of this function output over one period is shown by FIG. 10. The output of the selector 11 is supplied to the multiplier 16 as the musical tone signal and such volume envelope as an attack, a sustain and a decay is imparted thereto by the multiplier 16. The musical tone signal imparted with the volume envelope is converted into an analogue musical tone signal by the digital-to-analogue converter 17 and then produced as a musical sound by the sound system.

As above described, in this embodiment, since the reference value adapted to select one of a plurality of function generators is varied as the digital information varies it is possible to readily vary the shape of the musical tone waveform. Moreover, where a plurality of function generators which generate different functions are used it is possible to readily obtain musical tone waveforms having complicated shapes.

Figure 11:
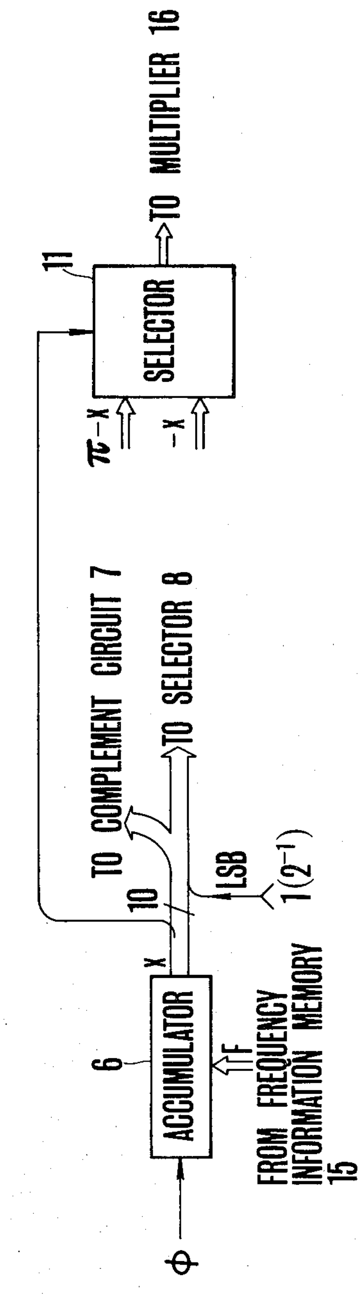
FIGS. 11 and 12 are block diagrams showing modifications of a portion of the electric circuit utilized in this invention.

It should be understood that the invention is not limited to the specific embodiments described above. For example, although in the embodiment shown in FIG. 1, the selection of the inputs A and B by the selector 11 was performed in response to the result of comparison of the absolute value $|x|$ of a digital information x and a reference value, in a modification shown in FIG. 11, a portion of the digital information produced by the accumulator 6 is extracted and used to select the inputs A and B of the selector 11 in accordance with the value (output of any one bit, for example, the most significant bit).

Figure 12:
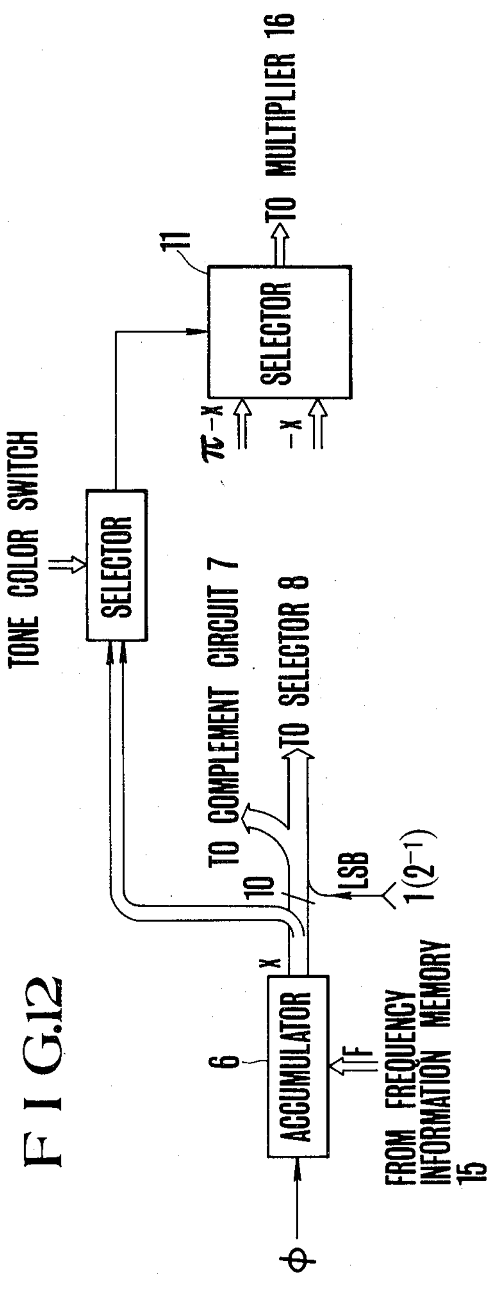

Further, as shown in FIG. 12, a plurality of bit outputs may be independently derived out from the digital information x for controlling the selector 11 under the control of the output of a manually operated tone color switch so as to send either one of the extracted informations to the selector 11. Thus, the selector 11 selects either one of the inputs A and B in accordance with the selected information. With this modification, it is possible to vary the selection level of the selector 11 for the inputs A and B.

As above described, according to the electronic musical instrument embodying the invention, a plurality of linear functions are generated based on a digital information which varies periodically and repeatedly corresponding to the tone pitch of a depressed key, and the linear functions are selected in accordance with the variation in the digital information to form a musical tone waveform so that it is possible to readily vary the shape of the musical tone waveform in an extremely complicated manner with a relatively simple circuit construction.

What is claimed is:

1. An electronic musical instrument comprising means for generating a digital number which varies periodically and repeatedly at a rate corresponding to the frequency of a tone pitch of a depressed key of a keyboard of a musical instrument, a plurality of function generators, each function generator respectively providing as an output thereof a different linear function in response to and as a function of said digital number, means for periodically and repeatedly selecting among the different outputs of said function generators during and in synchronism with each period of variation of said digital number, and means for generating a musical tone based on the selected outputs of the function generators selected by said selecting means, whereby said reproduced musical tone is generated by switching between said different selected outputs of said function generators during and synchronously with each cycle of said musical tone and in synchronism therewith.

2. An electronic musical instrument according to claim 1 wherein the means for selecting includes means for periodically and repeatedly switching among the selected function generator outputs during and in synchronism with the period of variation of said digital number.

3. An electronic musical instrument according to claim 1 or 2 wherein said digital information consists of plural digits and wherein said selecting means comprises means for producing a plurality of sub-numbers, each of which sub-numbers is a number constituted by less than all of the digits of said plural digits of said digital number, and a switch for selecting one of said sub-numbers, the selected sub-number determining the time at which the selecting among the outputs of said function generators occurs.

4. An electronic musical instrument according to claim 1 or 2 wherein said selecting means comprises a comparator which periodically and repeatedly compares the value of said digital number with a predetermined reference value for designating the time at which the selecting occurs.

5. An electronic musical instrument according to claim 1 or 2 wherein said timing of selecting the outputs of the plurality of function generators is formed by a portion of said digital number.

6. An electronic musical instrument according to claim 1 or 2 wherein said digital number generating means comprises an accumulator which repeatedly accumulates, at a definite speed, a value corresponding to the tone pitch of said depressed key.

7. An electronic musical instrument according to claim 4 wherein said reference value is a function which begins to decrease after key depression.

* * * * *